US007528955B2

(12) United States Patent
Orelli et al.

(10) Patent No.: US 7,528,955 B2
(45) Date of Patent: May 5, 2009

(54) COLOUR MEASUREMENT DEVICE AND MEASUREMENT PROCESS FOR THE DEVICE

(75) Inventors: Adrian Von Orelli, Zürich (CH); Beat Frick, Buchs (CH)

(73) Assignee: X-Rite Europe GmbH, Regensdorf (CH)

( * ) Notice: Subject to any disclaimer, the term of this patent is extended or adjusted under 35 U.S.C. 154(b) by 87 days.

(21) Appl. No.: 11/353,475

(22) Filed: Feb. 14, 2006

(65) Prior Publication Data
US 2006/0193512 A1 Aug. 31, 2006

(30) Foreign Application Priority Data
Feb. 16, 2005 (CH) ................................. 00264/05
Feb. 28, 2005 (CH) ................................. 00341/05

(51) Int. Cl.
*G01J 3/46* (2006.01)
(52) U.S. Cl. ........................ 356/402; 356/425
(58) Field of Classification Search ......... 356/402–425, 356/328
See application file for complete search history.

(56) References Cited
U.S. PATENT DOCUMENTS
5,671,059 A 9/1997 Vincent

| 6,028,682 | A | 2/2000 | Ott |
| 6,483,595 | B1 * | 11/2002 | Yakovlev et al. ............ 356/607 |
| 6,611,617 | B1 * | 8/2003 | Crampton ................... 382/154 |
| 2003/0169421 | A1 | 9/2003 | Ehbets |
| 2003/0202184 | A1 * | 10/2003 | Jung et al. .................. 356/419 |
| 2005/0052648 | A1 | 3/2005 | Frick et al. |

FOREIGN PATENT DOCUMENTS
EP 1507134 2/2005

OTHER PUBLICATIONS
Zwinkels J C: "Colour-measuring instruments and their calibration" Displays, Elsevier Science Publishers BV., Barking, GB, Bd. 16, Nr. 4, Mai 1996 (1996-05), Seiten 163-171, XP004032518 ISSN: 0141-9382.
European Search Report for European No. EP 06 00 1005 dated Jun. 30, 2008.

* cited by examiner

*Primary Examiner*—Gregory J Toatley, Jr.
*Assistant Examiner*—Tri T Ton
(74) *Attorney, Agent, or Firm*—McCarter & English, LLP

(57) ABSTRACT

A color measurement device includes a color measurement channel (20,30) and a control (C), which forms color measurement values from the measurement signals of the color measurement channel and from stored white calibration data. It further includes correction means in order to calculate or correct the color measurement values depending on different distances (a) and/or angles (α) to the measurement object. Because of the special measurement value correction, the color measurement device is especially suited for contactless measurement applications with variable distances and angle orientations relative to the measurement object.

16 Claims, 4 Drawing Sheets

COLOUR MEASUREMENT DEVICE AND MEASUREMENT PROCESS FOR THE DEVICE

Figure 1A:
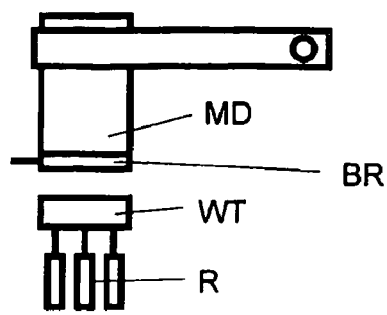
Figure 1B:
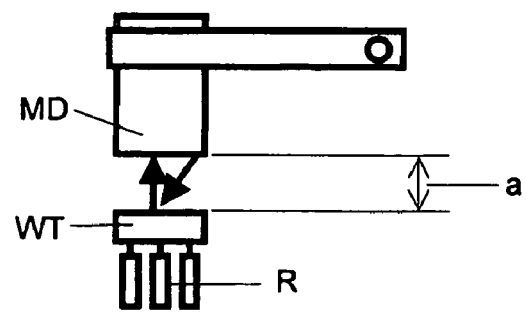
Figure 1C:
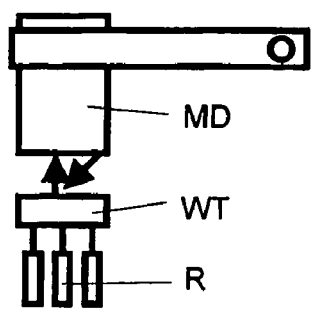
Figure 1D:
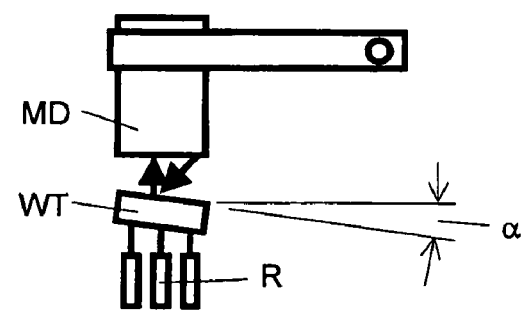

The invention relates to a colour measurement device, especially a spectrophotometer and a measurement process for such a measurement device.

In numerous applications of a colour measurement device, especially of a spectrophotometer, for example for the measurement of a printed sheet, the scanning must be contact free. The contract surface of the sheet is over the relatively large sheet surface generally not perfectly even. Therefore, distance variations occur during scanning. They cannot influence the measurement values. This requires that the illumination and the measurement light pick up arrangement of the measurement device be distance independent over the tolerated range of a few tenths of millimeters.

During measurements on printed materials (measurement objects) of different thickness, it is customary today to eliminate the different distances between the measurement surface and measurement arrangement which are caused by the different thicknesses of the printed material by way of a relative measurement. This means the measurement values are related to the signal from the base substrate at the given distance (for example to the white of the printed paper). Although this measurement result is thereby independent from the distance, it is dependent from the substrate used and therefore no longer directly comparable to measurement values based on other substrate materials.

With the present invention, a colour measurement device, especially a spectrophotometer of the generic type, is now to be improved with respect to distance and angle independence and thereby with respect to performance, precision and universality of the possible applications. Furthermore, a measurement process for such a colour measurement device is to be created which leads to distance and angle independent measurement results.

This object underlying the invention is achieved with a colour measurement device having a colour measurement channel and a control, which forms colour measurement values from the measurement signals of the colour measurement channel and stored white calibration data, whereby it includes correction means for calculating or correcting the colour measurement values depending on different distances and/or angles ($\alpha$) to the measurement object. This object is also achieved with a colour measurement process wherein a measurement object is photoelectrically scanned by way of a colour measurement device and colour measurement values are calculated from the measurement signals of the colour measurement device in combination with stored white calibration data, whereby during the calibration of the colour measurement device or during its operation, a set of white calibration data is determined and stored under defined and known conditions for a number of different distances and angle positions ($\alpha$) for a white reference, and that for the colour measurement value calculation on the basis of the distance and angle ($\alpha$) to the measurement object present during the measurement, the white calibration data associated with the distance and angle present are selected from the set of white calibration data and used for the colour measurement value calculation.

Preferred embodiments and further developments of the colour measurement device in accordance with the invention and the colour measurement process in accordance with the invention are the subject of the dependent claims.

Figure 3:
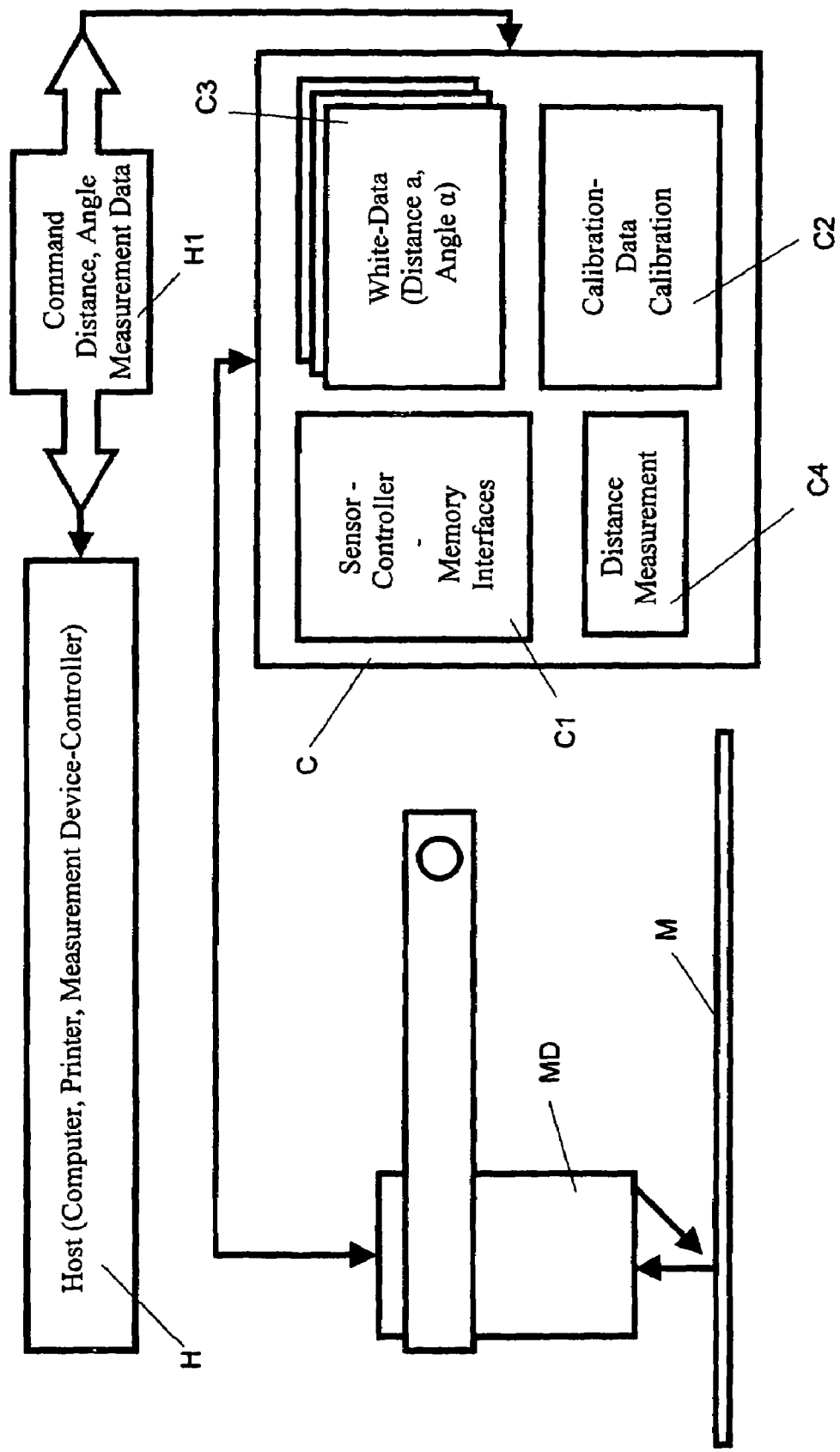
Figure 4:
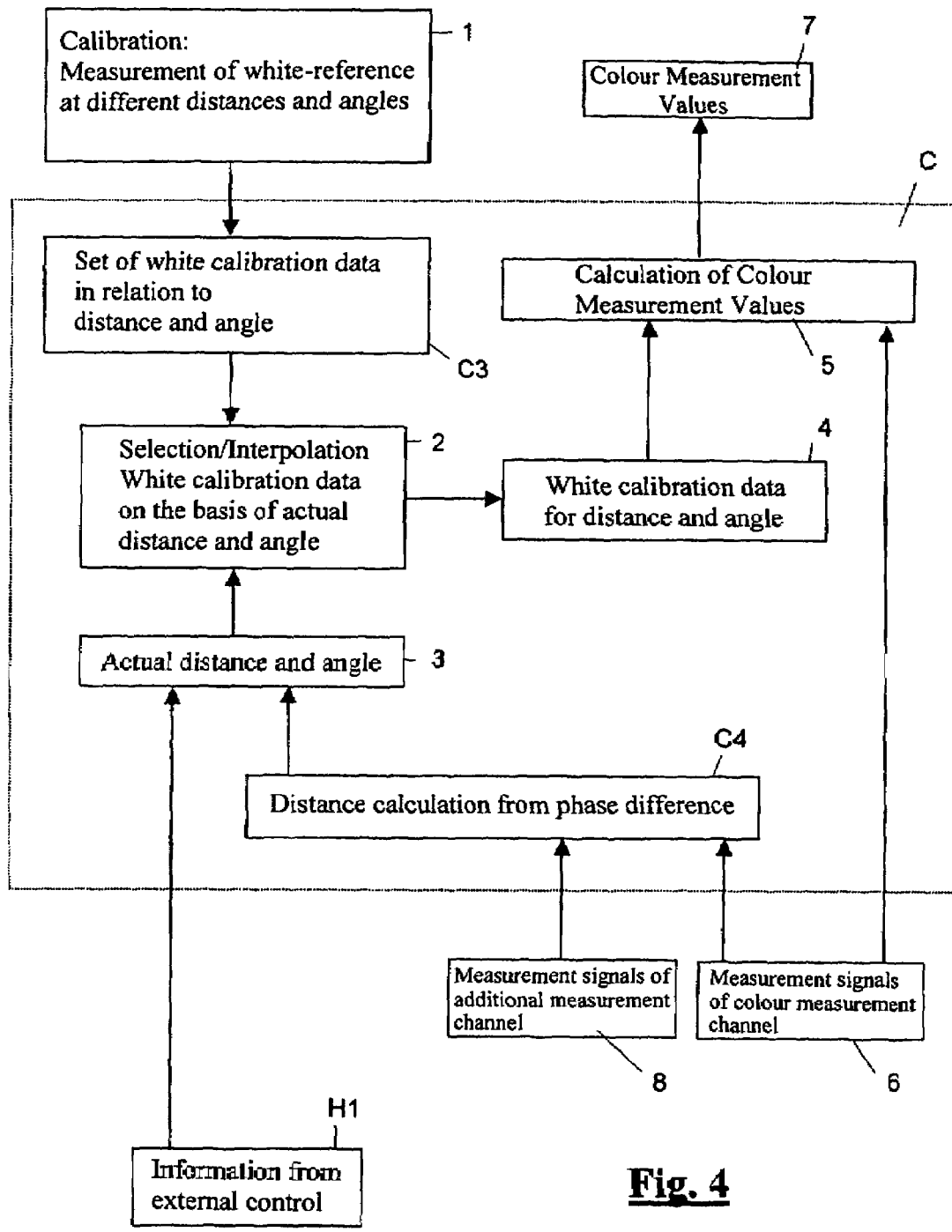
Figure 5A:
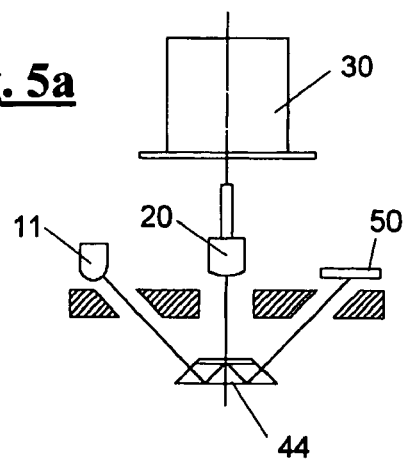
Figure 5B:
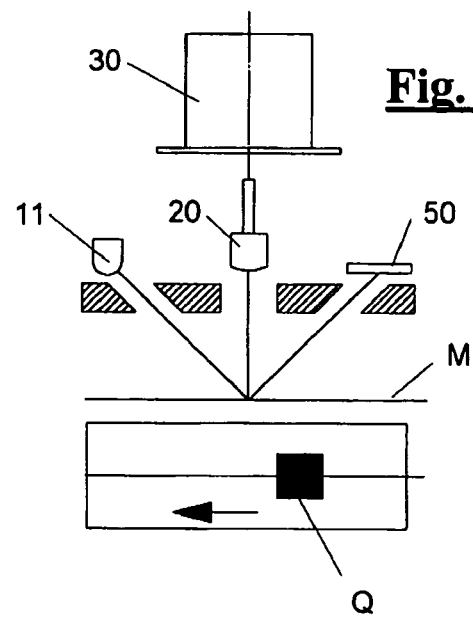

The invention is further described with reference to the drawings. It shows:

FIG. 1a to 1d a colour measurement device in four typical measurement situations during its calibration;

FIGS. 2a to 2d the colour measurement device in four typical measurement situations during the practical measurement applications;

FIG. 3 a schematic of the most important control components of the measurement device;

FIG. 4 a block diagram of the measurement process in accordance with the invention;

FIGS. 5a to 5b two sketches for the explanation of a distance measurement; and

Figure 6A:
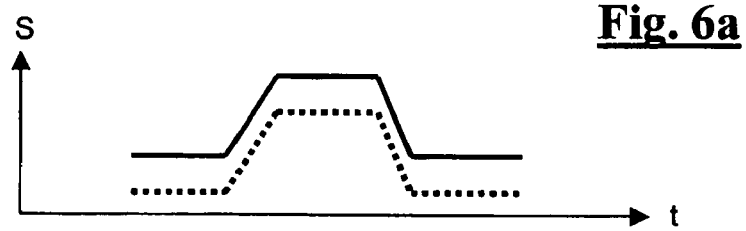
Figure 6B:
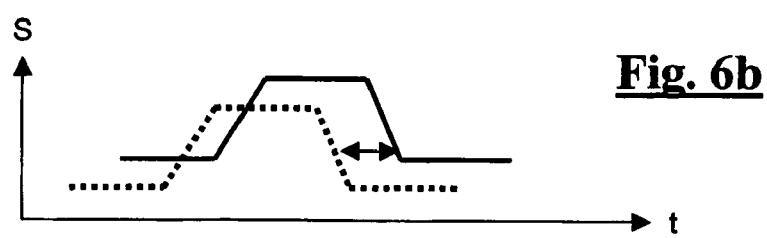
Figure 6C:
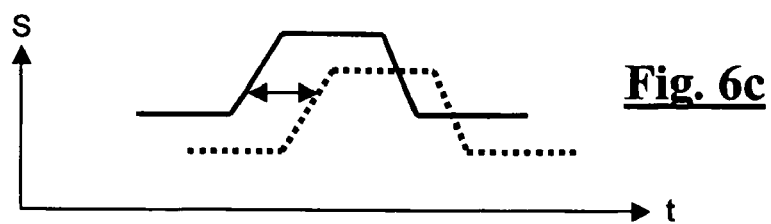

FIGS. 6a to 6c three typical measurement signal curves which occur in different situations during the distance measurement.

The most essential basic idea of the invention resides in a calibration of the colour measurement device, especially a spectrophotometer, to different measurement object distances (heights) and angles. An additional step is inserted therefor during the production of the colour measurement device, more exactly during its calibration, during which the specific properties of each measurement device produced are determined and during which the distance and/or angle dependency of each measurement device manufactured is measured.

These calibration measurements can be carried out, for example, such that a reference probe (reference measurement object), preferably a very exactly measured white table, is scanned at different distances and/or angles to the measurement device and the associated measurement data are stored in the measurement device (absolute white calibration). This is illustrated in FIGS. 1a to 1d. The colour measurement device is referred to as MD. The reference measurement object is referred to as WT and is positioned at different distances and angle locations relative to the colour measurement device MD by a measurement robot which is symbolized here only by three adjustable supporting members R. The relative white calibration of the colour measurement device is carried out by way of an internal white reference built into the measurement device, which is illustrated in FIG. 1a in the activated condition, which means inserted into the measurement beam path, and referred to as BR.

Concretely, the absolute white calibration of the sensor during manufacture is not only carried out exactly for a nominal distance and a nominal angle, but according to the invention for a set of different distances (heights) a and different angles $\alpha$, whereby a complete data set of calibration data C3 results, which each consist of a white value for each colour or each spectral range (in the simplest case a one dimensional vector). The calibration data set C3 is preferably stored in the measurement device for its control in association with the underlying distance and angle data.

FIG. 3 shows a principal schematic of the colour measurement device, especially a spectrophotometer, expanded and improved in this way. Illustrated are the colour measurement device MD and the typically processor based control C thereof. Control C includes in addition to the control unit C1 (control of the light sources, control of the photoelectric receiver, . . . ) and the conventional calibration data C2 present in each modern colour measurement device the already mentioned set of distance and angle dependent calibration data C3. Furthermore, the control C can also communicate through not illustrated interfaces in a conventional manner with a superior control H, for example receive commands and control data H1 or send measurement data to the control H.

Figure 2A:
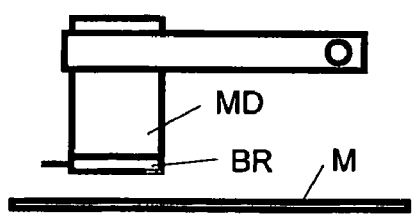
Figure 2B:
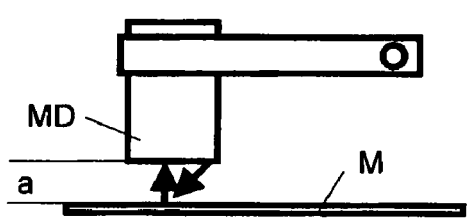
Figure 2C:
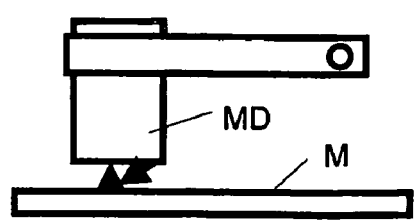
Figure 2D:
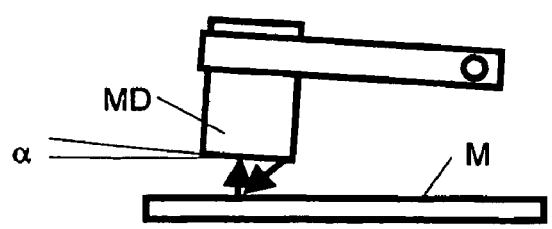

FIGS. 2a-d show a colour measurement device in the practical application in four different situations. In FIG. 2a, the internal white reference BR is activated for the relative white adjustment. In FIG. 2b, the measurement plane M is at the nominal distance a to the colour measurement device MD. In FIG. 2c, the distance is smaller than the nominal distance and in FIG. 2d, the measurement device or its scaning head are tilted at a small angle α relative to the measurement plane M.

For the practical application of the colour measurement device in a usable arrangement (not illustrated, for example a printer), two cases have to be distinguished: 1. distance and/or angle of the measurement object relative to the colour measurement device are known (for example through knowledge of the paper type used in a printer) and 2. distance and/or angle are not known.

In the first case, the distance and/or angle to the substrate to be measured is provided to the colour measurement device in suitable form. This can be done, for example, by way of a command H1 of the superior control H (FIG. 3) through the communication interface of the colour measurement device or its control C. For the exemplary concrete application of the colour measurement device in a printing machine, the latter provides the distance and/or angle to the colour measurement device.

Based on the knowledge of the distance and angle dependency defined by the calibration data set C3 previously stored in the colour measurement device and the also provided, actual orientation (distance a, angle α) between the colour measurement device and the measurement object, the brightness of the colorometric measurement result (or in a spectrophotometer the signal of the spectral measurement result) is corrected. Concretely, the respectively fitting white vector is thereby used for the calculation of the measurement data (remission spectrum or discrete remission values for each colour interval), which means the stored white vector C3 which was determined at the same distance a and at the same angle α during the original calibration. For not stored distance and angle values, one interpolates bi-linearly or extrapolates, for example, between the white vectors associated with the closest distance values and angle values.

If it is not possible to provide the colour measurement device with the geometric conditions under which the measurement will be carried out (application 2), the colour measurement device is expanded in accordance with the invention by an additional function C4 (FIG. 3), which allows it to determine the missing information by itself. For example, the distance measurement can be carried out by triangulation with the help of an additional optics. Especially practical and advantageous is however an approach according to a further aspect of the invention which temporarily correlates the signals of two different measurement channels of the colour measurement device and thereby gains a distance information. Modern spectrophotometers, for example the one described in EP A 1 507 134 (corresponding to U.S. patent application Ser. No. 10/894,797 of Jul. 20, 2004) include beside the spectral measurement channel often a separate reflex channel intended for gloss measurements. When an additional measurement channel, especially such a reflex channel, is present, it can be used for the distance determination in accordance with the invention so that no additional optical components are required. The distance measurement in accordance with the invention is described in the following with reference to FIGS. 5a to 5b and FIGS. 6a to 6c.

FIG. 5a shows a highly schematic illustration of the colour measurement device constructed here as a spectrophotometer, during the relative brightness calibration by way of the already mentioned brightness reference 44 inserted into the beam path. In FIG. 5b, the spectrophotometer is ready for the measurement of a measurement object located in the measurement plane M. The spectrophotometer has an illumination symbolized by a light emitting diode 11, a measurement light pickup optics 20, a spectrometer arrangement 30 and an additional photo receiver 50. The pickup optics 20 together with the spectrometer arrangement 30 forms the spectral measurement channel, while the additional photo receiver 50 forms the reflex channel intended for the gloss measurements.

For the generation of the distance information, the spectrophotometer (or generally the colour measurement device) is moved linearly and parallel over the measurement object (for example paper) located on the measurement plane M, or the measurement object is moved under the spectrophotometer. A sample, for example in the form of a black square Q (FIG. 5b) is provided, for example printed, on the measurement object. (For practical purposes, a suitable field of the object to be measured is used as the sample.). This sample Q is recognized by the two measurement channels (spectral channel 20, 30 and reflex channel 50) as a function of the distance between the measurement device and measurement object surface at different points in time. FIGS. 6a to 6c show the measurement signal curve of both measurement channels in three different situations. The continuous lines represent the signal curve of the spectral channel, the stippled lines those of the reflex channel. In FIG. 6a, the measurement object or its scanned surface is at the nominal distance from the colour measurement device and in FIGS. 6b and 6c at a smaller or larger distance. The phase shift of the signal curves of the two channels forms a measure for the distance between the colour measurement device and the measurement object and is determined in a further control module C4 of the control C of the colour measurement device or spectrophotometer and recalculated into corresponding distance data (FIG. 3). These distance data are then used for the selection or calculation (interpolation, extrapolation) of the associated white vector in the stored calibration data C3.

It is understood that the determination of the distance from the measurement object can also be carried out with other means and measurement methods, for example by way of mechanical or capacitive distance sensors.

The individual steps of the process in accordance with the invention are summarized once more in a block diagram in FIG. 4. The measurement of the white reference at different distances and angles is carried out in block 1, which results in the set of white calibration data C3. On the basis of the information 3 on the actual distance and angle, the associated white calibration data 4 are selected from the set C3 or calculated in block 2. The (conventional) calculation of the colour measurement data from the measurement signal 6 of the colour measurement channel and the white reference data 4 is carried out in block 5. The information 3 on the actual distance and angle is supplied either as corresponding data H1 from a superior control or calculated in block C4 from the phase locations of the measurement signals 6 of the colour measurement channel and the measurement signals 8 of the reflex channel.

The above described distance/angle correction can be used for different colour measurement devices, for example spectrophotometers, colourimeters, densitometers, etc., and is suitable for measurements on different substrate types, for example paper, foils, ceramic, fabric, plastic, leather, etc.

The distance/angle correction can be carried out at different levels: either in the colour measurement device or its control itself or in a superior arrangement, for example, a printer or a computer to which the colour measurement device is connected, or in the control of a measurement arrangement into which the colour measurement device is integrated.

The distance and angle correction in accordance with the invention can of course also be used in colour measurement devices which because of a special construction of the illumination already have a broad tolerance with respect to distance variations, as is the case, for example, in the spectrophotometer described in EP A 1 507 134 (corresponding to U.S. patent application Ser. No. 10/894,797 of Jul. 20, 2004). Although the distance tolerant construction of the illumination arrangement is of advantage since the required corrections then remain smaller, it is however not a basic requirement.

The above methods for angle correction can also be used in the case of contact measurements when, for example, for any reason the angle and distance cannot be optimally adjusted. This is the case, for example, when the measurement device or its scanning head roll on the substrate or rest thereon and take up angle positions which deviate from the nominal value because of different substrate thicknesses (nodding movement of the scanning head).

With the distance and angle correction in accordance with the invention, the loss of illumination light at non-nominal distances/angles is compensated by calculation and, therefore, a significant improvement of the absolute measurement precision is achieved. Furthermore, a higher inter-instrument precision is achieved, which means the correspondence of the measurement results from different colour measurement devices under identical non-optimal angle and distance conditions is improved, since not all colour measurement devices behave the same at the same deviation from the nominal position, which is due to manufacturing tolerances, especially tolerances of the illumination when light emitting diodes are used.

DRAWINGS

FIG. 3
Box H Host (Computer, Printer, Measurement Device-Controller)
Box H1 Command Distance, Angle Measurement Data
Box C & C1 Sensor-Controller Memory Interfaces
Box C4 Distance Measurement
Box C3 White-Data (Distance a, Angle α)
Box C2 Calibration-Data Calibration FIG. 4
Box 1 Calibration: Measurement of white-reference at different distances and angles
Box C3 Set of white calibration data in relation to distance and angle
Box 2 Selection/Interpolation White calibration data on the basis of actual distance and angle
Box 3 Actual distance and angle
Box H1 Information from external control
Box 7 Colour Measurement Values
Box 5 Calculation of Colour Measurement Values
Box 4 White calibration data for distance and angle
Box C4 Distance calculation from phase difference
Box 8 Measurement signals of additional measurement channel
Box 6 Measurement signals of colour measurement channel

The invention claimed is:

1. Colour measurement device comprising a colour measurement channel and a control for generating colour measurement values from measurement signals of the colour measurement channel and from stored white calibration data, and a correction means for calculating or correcting the colour measurement values depending on at least one of different distances (a) and angles (α) to a measurement object, wherein the correction means includes a set of white calibration data (C3) which were determined during calibration or during operation under defined and known conditions for a number of different distances (a) and angle positions (α) to a white reference (WT).

2. Colour measurement device according to claim 1, wherein the correction means is constructed for selecting a colour measurement value calculation on the basis of the actual distance (a) and angle (α) to the measurement object during the measurement, and white calibration data from the set of white calibration data (C3) which are associated with the actual distance and angle, and for using those calibration data for the colour measurement value calculation.

3. Colour measurement device according to claim 2, wherein the correction means is constructed for calculating from the set of white calibration data (C3) the white calibration data associated with the actual distance (a) and angle (α) by interpolation and extrapolation and to use them for the colour measurement value calculation.

4. Colour measurement device according to claim 3, wherein the correction means is constructed for receiving information on the actual distance (a) and angle (α) to the measurement object by way of a communication interface.

5. Colour measurement device according to claim 1, further comprising distance measurement means (C4) for determination of the distance (a) to the measurement object.

6. Colour measurement device according to claim 5, wherein the distance measurement means (C4) includes an additional measurement channel with its own photoreceptor.

7. Colour measurement device according to claim 6, wherein the distance measurement means (C4) is constructed for determining the distance to the measurement object on the basis of a phase difference between measurement signal curves of the additional measurement channel and the colour measurement channel.

8. Colour measurement device according to claim 7, wherein the additional measurement channel is provided by a gloss measurement channel.

9. Colour measurement device according to claim 1, wherein the correction means is provided by and incorporated in the control (C).

10. Colour measurement device according to claim 1, wherein the calculation or correction of the colour measurement values depends on the different distances (a) and angles (α) to the measurement object.

11. Colour measurement process for photoelectrically measuring a measurement object by a way of a colour measurement device (MD), comprising the steps of determining during calibration of the colour measurement device (MD) or during its operation under defined and known conditions a set of white calibration data (C3) and storing the white calibration data (C3) for a number of at least one of different distances (a) and angle positions (α) to a white reference (WT), and for colour measurement value calculation on the basis of at least one of the actual distance (a) and angle (α) to the measurement object (M) during measurement, selecting from the stored white calibration data (C3) those white calibration data associated with the at least one of actual distance and angle and using the selected white calibration data for the calculation of the colour measurement values from measurement signals of the colour measurement device.

12. Colour measurement process according to claim 11, wherein the white calibration data to be used and associated with the actual distance (a) and angle (α) are calculated from the set of white calibration data (C3) by interpolation or extrapolation.

13. Colour measurement process according to claim 11, wherein information on the actual distance (a) and angle (α) is supplied manually or by an external control (H).

14. Colour measurement device according to claim 11, wherein the actual distance (a) to the measurement object is measured.

15. Colour measurement process according to claim 14, wherein for the measurement of the actual distance (a) to the measurement object (M) the measurement signals of two measurement channels of the colour measurement device (MD) are temporarily correlated, whereby a phase difference between the measurement signals of the two measurement channels is determined as a measure for the actual distance and analyzed.

16. Colour measurement process according to claim 15, wherein a colour measurement channel and a reflex channel of the colour measurement device (MD) are used as the measurement channels.

* * * * *